United States Patent [19]

Shiraishi

[11] Patent Number: 4,878,066

[45] Date of Patent: Oct. 31, 1989

[54] BEAM SCANNER WITH DISTORTION CORRECTION

[75] Inventor: Takashi Shiraishi, Yokohama, Japan

[73] Assignee: Kabushiki Kaisha Toshiba, Kawasaki, Japan

[21] Appl. No.: 245,207

[22] Filed: Sep. 16, 1988

[30] Foreign Application Priority Data

Sep. 18, 1987 [JP] Japan ................... 62-232344

[51] Int. Cl.⁴ ................... G01D 15/14; H04N 1/024
[52] U.S. Cl. ................... 346/108; 358/296
[58] Field of Search ............... 346/108, 107 R, 76 L, 346/160; 358/296, 300, 302, 283

[56] References Cited

U.S. PATENT DOCUMENTS 4,788,560 11/1988 Miura .................... 346/108

FOREIGN PATENT DOCUMENTS 62-257267 11/1987 Japan .

Primary Examiner—H. Broome
Assistant Examiner—Mark Reinhart
Attorney, Agent, or Firm—Foley & Lardner, Schwartz, Jeffery, Schwaab, Mack, Blumenthal & Evans

[57] ABSTRACT

An optical apparatus for an image forming apparatus has a laser emission device. The laser emission device has first and second light emission units for emitting first and second laser beams. The first and second laser beams emitted by the light emission units are collimated by a collimator lens, and their radii are regulated by a stop. These laser beams are scanned by a scanning mirror on a photosensitive drum in the main scan direction. Distortion of the scanned first and second laser beams is corrected by first and second f-θ lenses. In these f-θ lenses, power for focusing the laser beams in the sub-scan direction is larger than power for focusing the laser beam in the main scan direction.

14 Claims, 20 Drawing Sheets

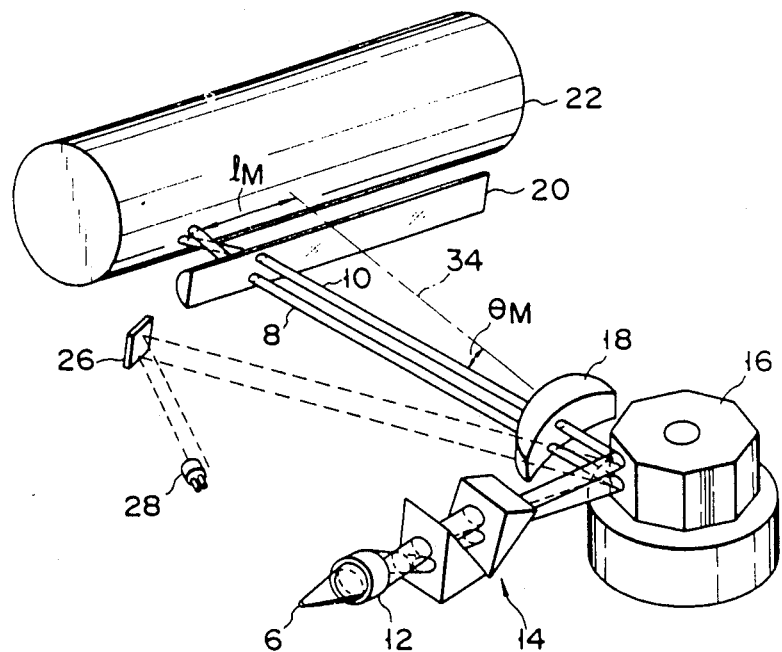
F I G. 1
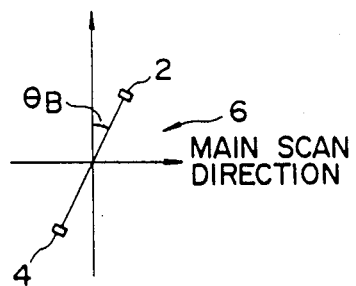
F I G. 2

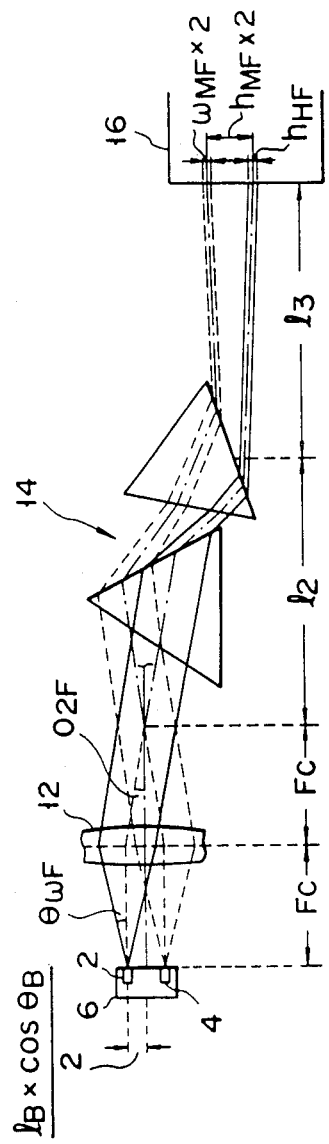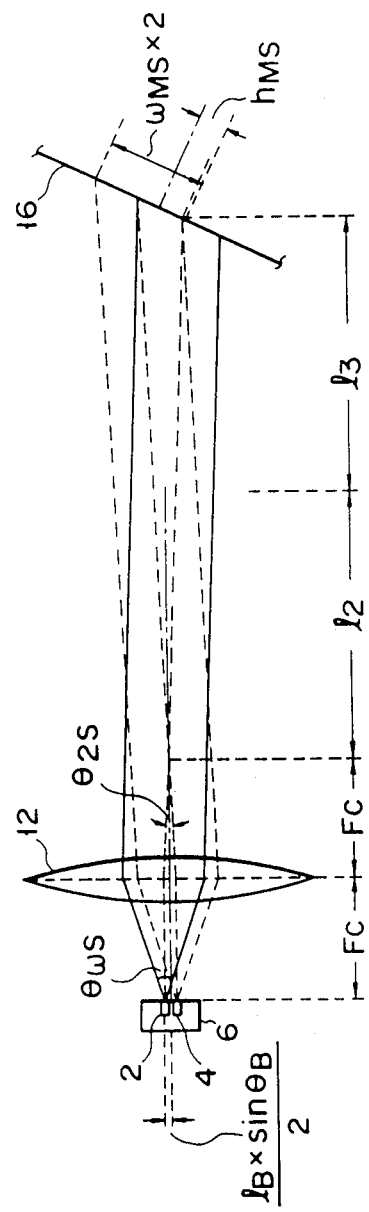

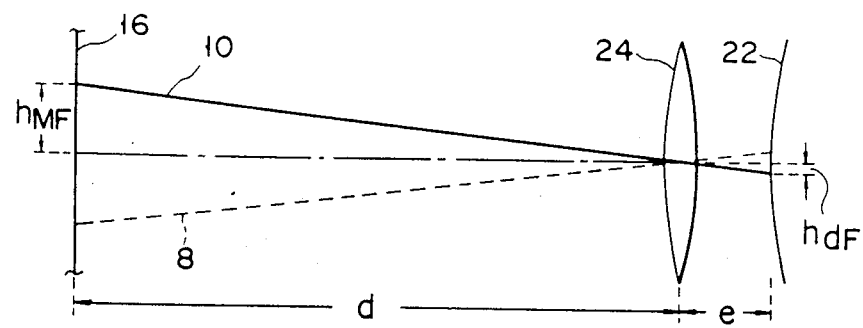
F I G. 6
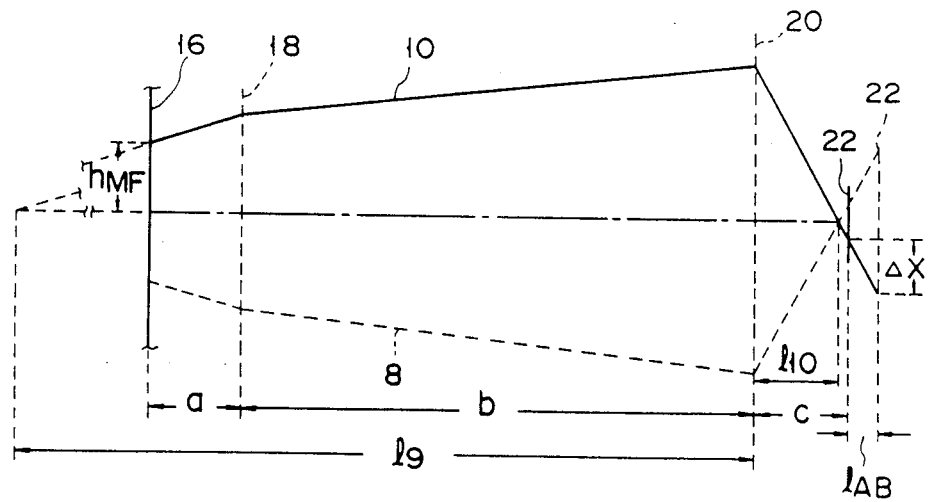
F I G. 7

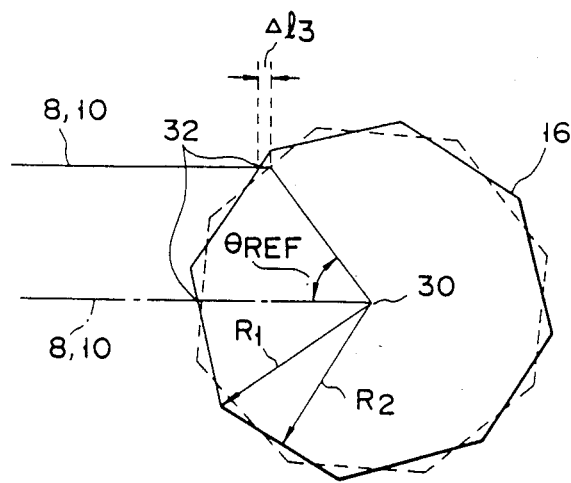
F I G. 8

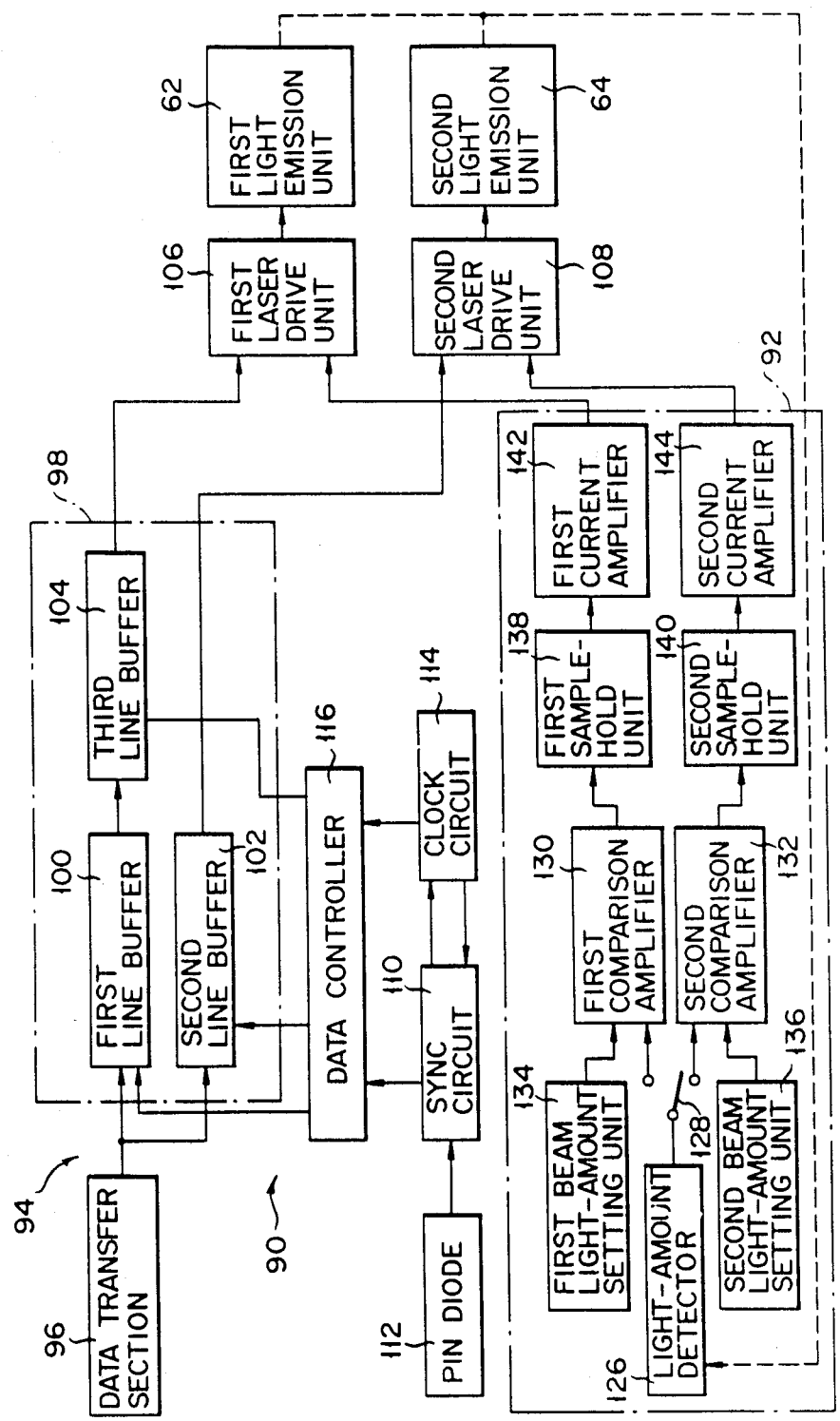
F I G. 12

| LINE NUMBER | | LASER BEAM POSITION [S] |
|---|---|---|
| A1 | A | 0 |
| B0 | | 1 |
| A2 | B | 2 |
| B1 | | 3 |
| A3 | | 4 |
| B2 | | 5 |
| ⋮ | | ⋮ |
| An | | |
| Bn-1 | | |
| ⋮ | | |

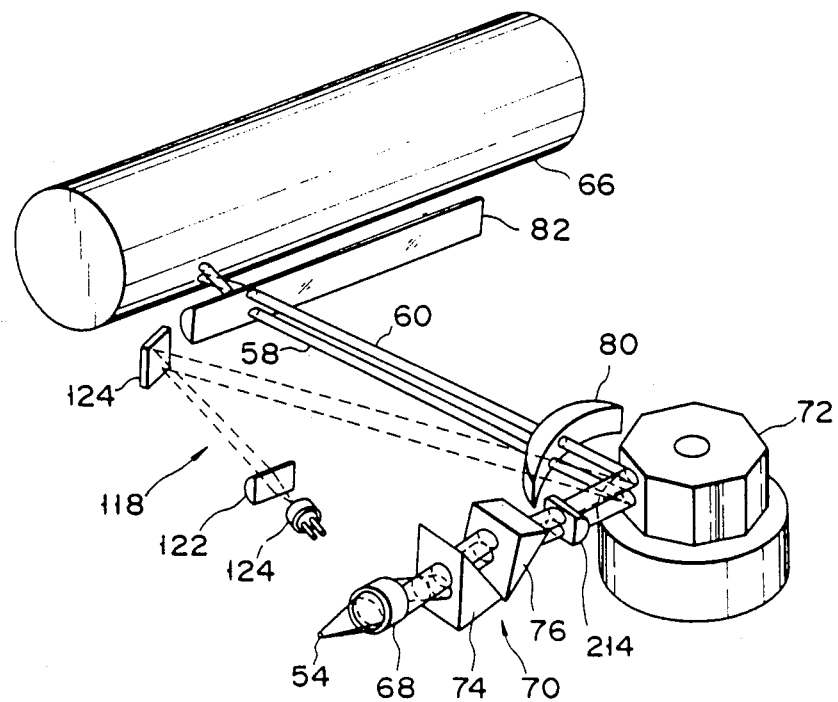
F I G. 25
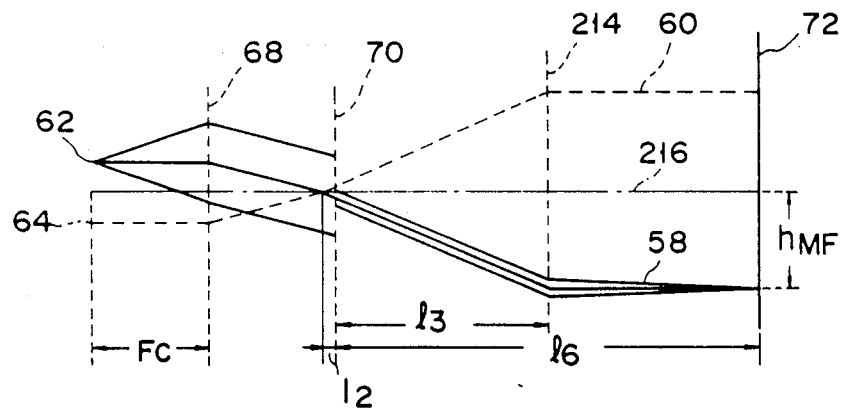
F I G. 26

BEAM SCANNER WITH DISTORTION CORRECTION

BACKGROUND OF THE INVENTION

1. Field of the Invention

The present invention relates to an optical apparatus of an image forming apparatus such as a laser printer or a copying machine, which radiates a laser beam onto an image carrier to form an image.

2. Description of the Related Art

In an image forming apparatus such as a copying machine or a printer, as an apparatus for forming an electrostatic latent image on a photosensitive drum, one using a laser beam is frequently used. In such an apparatus, a diverging laser beam emitted from a laser emission device such as a semiconductor laser propagates through a collimator lens and a prism compressor, and is converted to a collimated beam. The laser beam is then guided to a scanning mirror which rotates at high speed, so that its reflection direction is changed in accordance with rotation of the scanning mirror, and scans along the longitudinal direction (main scan direction) of the photosensitive drum. Thus, an electrostatic latent image is formed on the photosensitive drum.

In this apparatus, the laser emission device includes a single emission unit. For this reason, if an image forming speed is to be increased, it is restricted by a rotational speed of the scanning mirror and the like, and a remarkably high-speed image forming operation cannot be achieved.

For this reason, in recent years, an apparatus has been developed wherein the photosensitive drum is simultaneously scanned with a plurality of laser beams emitted from a plurality of light emission units. In this apparatus, first and second laser beams 8 and 10 emitted from laser emission device 6 having first and second light emission units 2 and 4 propagate through single collimator lens 12 to be converted to collimated beams. Laser beams 8 and 10 propagate through identical prism compressor 14, so that the widths of laser beams 8 and 10 in the sub-scan direction are compressed. Laser beams 8 and 10 are then radiated on scanning mirror 16. First and second laser beams 8 and 10 reflected by scanning mirror 16 are focused by first and second f-θ lenses 18 and 20, and are then guided toward photosensitive drum 22. Thus, first and second laser beams 8 and 10 are scanned in the longitudinal direction as the main scan direction on photosensitive drum 22. As a result, electrostatic latent images corresponding to the two laser beams are simultaneously formed. Thus, the image forming speed can be increased.

However, in this apparatus, a pitch between laser beam spots in the sub-scan direction perpendicular to the main scan direction on photosensitive drum 22 is normally several tens of micrometers, while a pitch between first and second light emission units 2 and 4 must be at least 100 micrometers in order to prevent a variation in output due to thermal interference therebetween.

For this reason, in this apparatus, laser emission device 6 is inclined at $\theta_B$ (deg) with respect to the sub-scan direction, as shown in FIG. 2, so that first and second laser beams 2 and 4 simultaneously scan on adjacent scanning lines on photosensitive drum 22. Therefore, in this apparatus, since laser emission device 6 is inclined, if first and second laser beams 8 and 10 are radiated on photosensitive drum 22 in this state, image A formed by a laser beam spot of first laser beam 8 is offset by $\Delta l_D$ from image B formed by the laser beam spot of second laser beam 10 in the main scan direction, as shown in FIG. 3. Even if an offset between two images A and B is reduced by electrical processing, image quality is considerably degraded, and sectional shapes of laser beams 8 and 10 on photosensitive drum 22 are inclined, resulting in further degraded image quality.

Image point distance $\Delta l_D$ as an offset between laser beams 8 and 10 in the main scan direction will be described in detail below.

The optical principle until laser beams 8 and 10 are radiated on photosensitive drum 22 in this apparatus will be described with reference to FIGS. 4 to 8. In FIGS. 4 and 5, light emission units 2 and 4 are arranged at a focal point of collimator lens 12 for collimating laser beams 8 and 10 into collimated beams. If a diffusion angle in the sub-scan direction of laser beam 8 or 10 in light emission unit 2 or 4 is represented by $\theta_{\omega F}$ (deg), and its diffusion angle in the main scan direction is represented by $\theta_{\omega S}$ (deg), beam radius $\omega_F$ (mm) in the sub-scan direction and beam radius $\omega_S$ (mm) in the main scan direction in collimator lens 12 are:

$$\omega_F = F_C \times \tan\theta_{\omega F}, \quad \omega_S = F_C \times \tan\theta_{\omega S} \quad (1)$$

(where $F_C$ is the focal length of collimator lens 12) If an inclination of a beam center in the sub-scan direction when the beam is output from collimator lens 12 is represented by $\theta_{2F}$ (deg) and an inclination of the beam center in the main scan direction is represented by $\theta_{2S}$ (deg), the following relations are established:

$$\tan\theta_{2F} = \frac{l_B \times \cos\theta_B}{2F_C} \quad (2)$$

$$\tan\theta_{2S} = \frac{l_B \times \sin\theta_B}{2F_C} \quad (3)$$

(where $l_B$ is the distance between first and second light emission units 2 and 4, and $\theta_B$ is the angle defined between a line connecting first and second light emitting units 2 and 4 and the sub-scan direction) Thereafter, if the radii of laser beams 8 and 10 in the sub-scan direction are multiplied with $\alpha$ by prism compressor 14, since the angle between two main beam components of laser beams 8 and 10 becomes $1/\alpha$, beam radius $\omega_{MF}$ (mm) in the sub-scan direction and beam radius $\omega_{MS}$ (mm) in the main scan direction in scanning mirror 16 are:

$$\omega_{MF} = \alpha\omega_F = \alpha F_C \times \tan\theta_{\omega F} \quad (4)$$

$$\omega_{MS} = \omega_S = F_C \times \tan\theta_{\omega S} \quad (5)$$

Distance $h_{MF}$ (mm) of laser beams 8 and 10 from the optical axis in the sub-scan direction and distance $h_{MS}$ (mm) thereof from the optical axis in the main scan direction are given by:

$$h_{MF} \simeq l_2 \times \tan\theta_{2F} + l_3 \times \tan(\theta_{2F}/\alpha) \quad (6)$$

$$h_{MS} \simeq (l_2 + l_3) \times \tan\theta_{2S} \quad (7)$$

(where $l_2$ (mm) is the distance from an image-side focal point of collimator lens 12 to the exit of prism compressor 14, and $l_3$ is the distance from the light output side of prism compressor 14 to scanning mirror 16)

The optical principle while the laser beams reach photosensitive drum 22 from scanning mirror 16 will be described with reference to FIG. 6. In FIG. 6, reference numeral 24 denotes an imaginary equivalent lens having composite focal length $F_1$ equivalent to a synthesized one of first and second f-θ lenses 18 and 20. In order to correct surface oscillation on each mirror surface of scanning mirror 16, the following relation is established over the entire length of photosensitive drum 22 in the longitudinal direction:

$$1/d + 1/e = 1/F_1 \qquad (8)$$

(where d (mm) is the optical path length from scanning mirror 16 to equivalent lens 24 in the sub-scan direction, and e (mm) is the optical path length from equivalent lens 24 to photosensitive drum 22 in the sub-scan direction) Under this condition, if a distance of laser beam 8 or 10 from the optical axis in the sub-scan direction on photosensitive drum 22 is represented by $h_{dF}$ (mm), the following relation is established:

$$h_{dF}/h_{MF} = e/d = \beta \qquad (9)$$

(where β is the absolute value of the lateral magnification of equivalent lens 24)

Therefore, as shown in FIG. 3, when adjacent 0.085-mm wide scanning lines are simultaneously scanned without forming an interval between first and second laser beams 8 and 10 in the sub-scan direction, the following relation must be established:

$$\beta \times \theta_{MF} = h_{dF} = P_2/2 \qquad (10)$$

(where $P_2$ is the pitch in the sub scan direction) For example, if d = 842.762 mm, e = 123.987 mm, and $F_1$ = 108.085 mm, $\beta \doteq 0.14712$ from equation (9). Since $P_2$ = 0.085 mm, from equations (4) and (10), $\beta \omega_{MF} = \beta a F_C = \tan \theta_{\omega F} = P_2/2 = 0.085/2$, and hence, $\omega_{MF} = 0.085/(2 \times 0.14712) \doteq 0.29$ mm. If $a = 1/5$ and $\tan \theta_{\omega F} = 0.15$, $F_C = 0.085/(2 \beta a \times \tan \theta_{\omega F}) \doteq 0.629$ mm.

From equations (6), (9), and (10), $$h_{MF} = h_{dF}/\beta = P_2/2\beta = 0.085/(2 \times 0.14712) \qquad (11)$$
$$= l_2 \times \tan\theta_{2F} + l_3 \times \tan(5 \times \theta_{2F})$$

Meanwhile, if $l_B = 0.1$ mm, $\tan \theta_{2F} = (0.1 \times \cos\theta_B)/(2 \times 9.629) = 5.1926 \times 10^{-3} \cos \theta_B$ from equation (2). Therefore, if $l_2 = 10$ mm and $l_3 = 10$ mm, From equation (11), $$0.085/(2 \times 0.14712) = 10 \times \tan\theta_{2F} + 10 \times \tan(5 \times \theta_{2F})$$
$$= 10 \times 6 \times 5.1926 \times 10^{-2} \cos\theta_B$$

Since $\cos\theta_B \approx 0.9272$, $\theta_B \doteq 22$ deg.

From equation (3), $$\tan\theta_{2S} = 0.1 \times \sin\theta_B/(2 \times 9.629) = 1.945 \times 10^{-3}$$

then $$\theta_{2S} \doteq 0.111 \text{ (deg)} = 0.111 \times 2\pi/360$$
$$= 1.9373 \times 10^{-3} \text{ (rad)}$$

If focal length f of f-θ characteristics in the main scan direction is given by f = 210 (mm), images are offset by $\Delta l_D = F \times \theta_{2S} = 210 \times 1.9373 \times 10^{-2} \approx 0.407$ (mm) as image point distance $\Delta l_D$ of laser beams 8 and 10 in the main scan direction.

In this apparatus, the offset of the images formed by first and second laser beams 8 and 10 on photosensitive drum 22 due to inclination of laser emission device 6 is corrected as follows. More specifically, as shown in FIG. 1, the starting portion of the beam reflected by horizontal sync reflection mirror 26 is detected by horizontal sync detection pin diode 28. This detection signal is supplied to a sync signal detector (not shown). When the sync signal detector sends a sync signal to a controller (not shown), the controller delays an information signal of second laser beam 10 from an information signal of first laser beam 8 by a predetermined period of time by a shift register with reference to the sync signal, thereby correcting the image offset. The delay time by the shift register is set by an operator while observing a printed image.

In this apparatus, the following approximate expressions are also established based on FIG. 7:

$$\Delta X = (h_{MF} + a \times \tan\Delta\theta/\cos\theta_M) \times \frac{-l_3}{b - l_3} \times \frac{l_{AB}}{l_{10}} \qquad (12)$$

(where Δθ is the angle between the optical axis 34 and the main beam reflected from scanning mirror 16, which is influenced by the plane inclination of scanning mirror 16)

$$l_9 = -\left(\frac{1}{f_1} - \frac{\tan\Delta\theta}{h_{MF} \times \cos\theta_M + a\tan\Delta\theta}\right)^{-1} + b \qquad (13)$$

$$l_{10} = \left(\frac{1}{f_1} - \frac{1}{l_3}\right)^{-1} \qquad (14)$$

On the other hand, the following approximate expression is established based on FIG. 8. More specifically, from equations (6) and (9).

$$h_{dF} = \beta h_{MF} = \beta(l_2 \times \tan\theta_{2F} + l_3 \times \tan(\theta_{2F}/a)) \qquad (15)$$

However, $l_3$ is varied depending on the radiation position on scanning mirror 16, and the variation is given by:

$$\Delta l_3 \doteq (R_1 - R_2)/\cos\theta_{REF} \qquad (16)$$

(where $R_1$ is the radius of a circumcircle of scanning mirror 16, $R_2$ is the radius of an inscribed circle of scanning mirror 16, $\theta_{REF}$ is the angle defined between a line connecting center 30 of scanning mirror 16 and radiation position 32 of laser beam 8 or 10 and laser beam 8 or 10)

Therefore, $$\Delta h_{dF} \doteq \beta \Delta l_2 \times \tan(\theta_{2F}/\alpha) \quad (17)$$
$$\doteq \beta(R_1 - R_2)/\cos\theta_{REF} \times \tan(\theta_{2F}/\alpha)$$

In this apparatus, first f-θ lens 18 has focal length f, and focuses laser beams 8 and 10 on photosensitive drum 22 in the main scan direction, so that distance $l_M$ from an intersection between optical axis 34 and drum 22 on drum 22 in the main scan direction is given by $l_M = f\theta_M$ when laser beams 8 and 10 are scanned at angle $\theta_M$ with respect to optical axis 34 of first and second f-θ lenses 18 and 20. Meanwhile, second f-θ lens 20 corrects oscillation of laser beams 8 and 10 in the sub-scan direction caused by surface oscillation of each surface of scanning mirror 16, and focuses laser beams 8 and 10 in the sub-scan direction.

Therefore, focusing of laser beams 8 and 10 in the sub-scan direction is performed mainly by second f-θ lens 20 only. For this reason, the heights of laser beams 8 and 10 at second f-θ lens 20 are large, and as a result, incident angles of laser beams 8 and 10 from second f-θ lens 20 to photosensitive drum 22 are increased. For this reason, if a distance from second f-θ lens 20 to photosensitive drum 22 varies, laser beams 8 and 10 are largely offset on photosensitive drum 22 in the sub-scan direction. As a result, image quality is considerably degraded.

SUMMARY OF THE INVENTION

It is an object of the present invention to provide an optical apparatus in an image forming apparatus, which can greatly eliminate a deviation of a light beam in the sub-scan direction on an image carrier regardless of a variation in distance from distortion correction means to the image carrier, and can improve image quality.

According to an aspect of the present invention, there is provided an optical apparatus for an image forming apparatus, which comprising:

means for emitting a light beam;

means for scanning the light beam emitted by said emitting means in a first direction on said image carrier; and correction means for correcting distortion of the light beam scanned by said scanning means, said correction means having a correction lens in which power for focusing the light beam in a second direction perpendicular to the first direction is larger than power for focusing the light beam in the first direction.

Other objects, features, and advantages of the present invention will become apparent from the following detailed description. It should be understood, however, that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 1 is a perspective view showing a conventional optical apparatus used in an image forming apparatus;

FIG. 2 is a view for explaining an installation direction of a light emission unit of a laser emission device of the apparatus shown in FIG. 1;

FIG. 4 is a view for explaining a laser beam path in the sub-scan direction between the laser emission device and a scanning mirror of the optical apparatus shown in FIG. 1;

FIG. 5 is a view for explaining a laser beam path in the main scan direction between the laser emission device and the scanning mirror of the optical apparatus shown in FIG. 1;

FIG. 6 is a view for explaining a laser beam path in the sub-scan direction by an imaginary equivalent lens between the scanning mirror and the photosensitive drum of the optical apparatus shown in FIG. 1;

FIG. 7 is a view for explaining a laser beam path in the sub-scan direction between the scanning mirror and the photosensitive drum of the optical apparatus shown in FIG. 1;

FIG. 8 is a view for explaining oscillation of light reflection surfaces of the scanning mirror of the optical apparatus shown in FIG. 1;

FIG. 12 is a block diagram showing a laser driver of the optical apparatus shown in FIG. 9;

FIG. 25 is a perspective view showing an optical apparatus according to a fourth embodiment of the present invention;

FIG. 26 is a view for explaining a laser beam path in the sub-scan direction to a scanning mirror of the optical apparatus shown in FIG. 25;

DETAILED DESCRIPTION OF THE PREFERRED EMBODIMENTS

Figure 3:
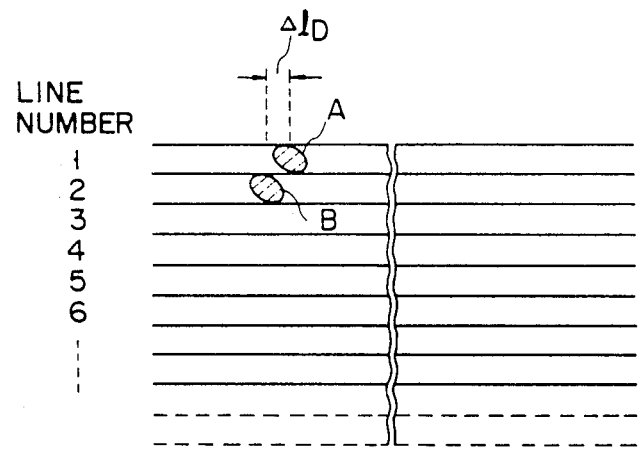
FIG. 3 is a view for explaining images on a photosensitive drum formed by the optical apparatus shown in FIG. 1.

A first embodiment of the present invention will be described hereinafter with reference to FIGS. 9 to 17.

For equations used in the conventional apparatus, the same reference numerals and symbols as described above are used with reference to the same drawings.

Figure 9:
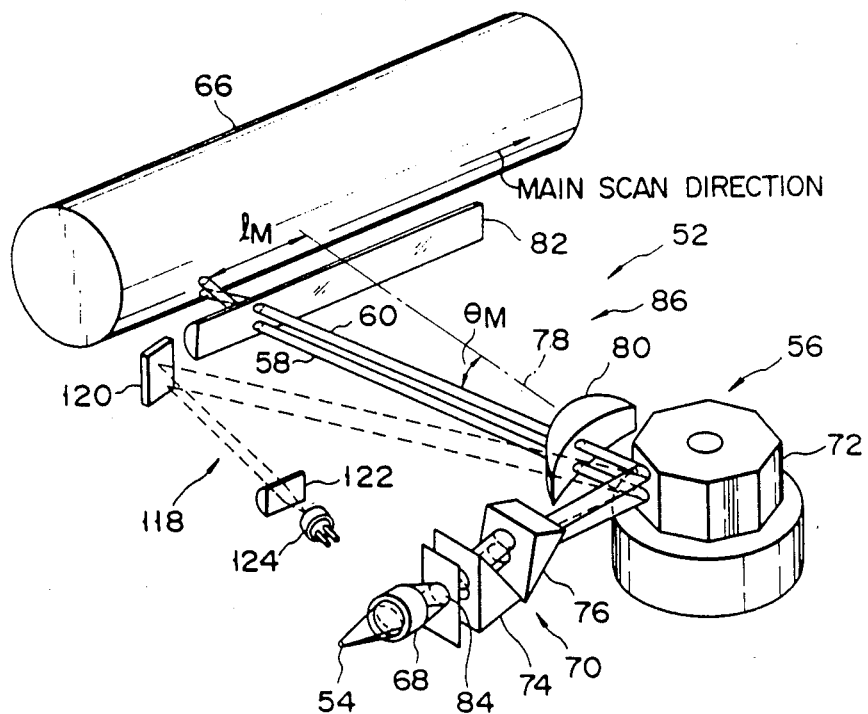
FIG. 9 is a perspective view showing an optical apparatus for an image forming apparatus according to a first embodiment of the present invention.
Figure 10:
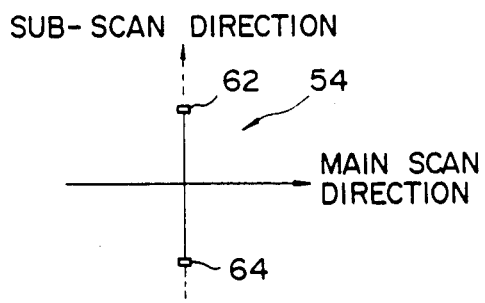
FIG. 10 is a view for explaining an installation direction of a light emission unit of a laser emission device of the optical apparatus shown in FIG. 9.

FIG. 9 shows optical apparatus 52 of a printer (not shown) which is operated in response to an instruction from a host system (not shown) such as a computer. Optical apparatus 52 has laser emission device 54 and radiation device 56. Laser emission device 54 has first and second light emission units 62 and 64, comprising semiconductor lasers, for emitting first and second laser beams 58 and 60, respectively, as shown in FIG. 10. First and second light emission units 62 and 64 are juxtaposed to be parallel to the sub-scan direction and to have an interval of 100 $\mu$m therebetween. Radiation device 56 is arranged between laser emission device 54 and photosensitive drum 66 so as to radiate first and second laser beams 58 and 60 onto photosensitive drum 66. Radiation device 56 has collimator lens 68, prism compressor 70, and scanning mirror 72.

Collimator lens 68 is a plastic lens, and the emission units has diffusion angle $\theta_{\omega F}$ in the sub-scan direction to yield tan $\theta_{\omega F}=0.15$. Collimator lens 68 has focal length $F_C=9.629$ mm, refractive index $n=1.492$, temperature coefficient $\partial n/\partial t = -1.1\times 10^{-4}/°C.$, and linear expansion coefficient $1/1 \times \partial 1/\partial t = 7 \times 10^{-5}$ mm/° C., so that laser beams 58 and 60 are collimated to collimated beams having beam radius $\omega_F \approx 1.444$ mm from equation (1).

Prism compressor 70 has first and second prisms 74 and 76, and compresses laser beams 58 and 60 from collimator lens 68 at compression ratio $1/a=5$ to have a width corresponding to beam radius $\omega_{MF} \approx 0.289$ mm from equation (4).

Scanning mirror 72 is rotated at 6,000 rpm, and scans laser beams 58 and 60 in the main scan direction as a second direction. Reference numeral 78 denotes an optical axis of focusing lens systems 80 and 82 such as f-$\theta$ lenses. $\phi 6 \times 2.9$ (mm) elliptic stop 84 is disposed at a focal point of collimator lens 68 between collimator lens 68 and prism compressor 70.

Radiation device 56 has f-$\theta$ lens system 86 having the absolute value of the lateral magnification $\beta=1$ in the sub-scan direction. f-$\theta$ lens system 86 has plastic first and second f-$\theta$ lenses 80 and 82 between scanning mirror 72 and photosensitive drum 66. First F-$\theta$ lens 80 as focal length $f_{1S}=-111.128$ mm in the main scanning direction, and has focal length $f_{1F}=30$ mm in the sub-scan direction, so as to correct surface oscillation of scanning mirror 72 together with second f-$\theta$ lens 82. Second f-$\theta$ lens 82 has a cylindrical lens shape having focal length $f_{2F}=30$ mm in the sub-scan direction.

In each of f-$\theta$ lenses 80 and 82, power for focusing light is expressed by a reciprocal number of the absolute value of its focal length. In first f-$\theta$ lens 80, power for focusing light in the main scan direction is given by $W_{1S} \approx -8.999 \times 10^{-3}$, and power for focusing light in the sub-scan direction is given by $W_{1F} \approx 33.33 \times 10^{-3}$. In second f-$\theta$ lens 82, power for focusing light in the main scan direction is given by $W_{2S} \approx 0$, and power for focusing light in the sub-scan direction is given by $W_{2F}=33.33 \times 10^{-3}$.

Figure 11A:
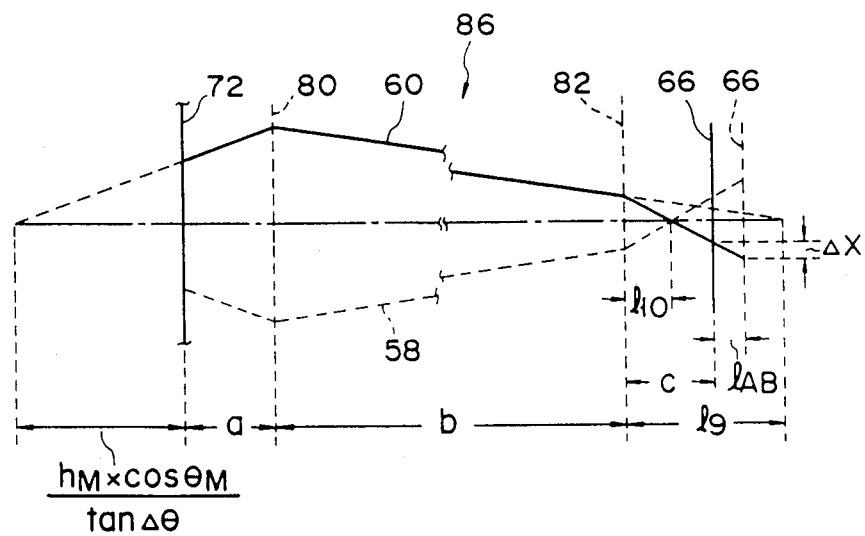
FIGS. 11A and 11B are views for explaining a laser beam path in the sub-scan direction between a scanning mirror and a photosensitive drum of the optical apparatus shown in FIG. 9.
Figure 11B:
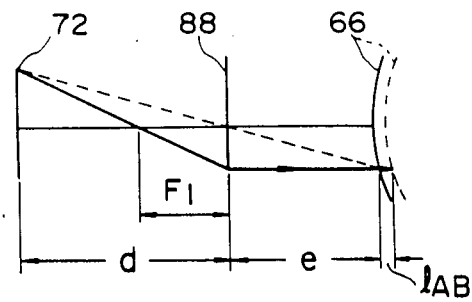

If distances between respective components between scanning mirror 72 and photosensitive drum 66 are represented as shown in FIGS. 11A and 11B, a=30 mm, b=200 mm, and c=30 mm. In FIG. 11B, reference numeral 88 denotes an imaginary equivalent lens having composite focal length $F_1$ equivalent to a composite one of first and second f-$\theta$ lenses 80 and 82.

Figures 13, 14:
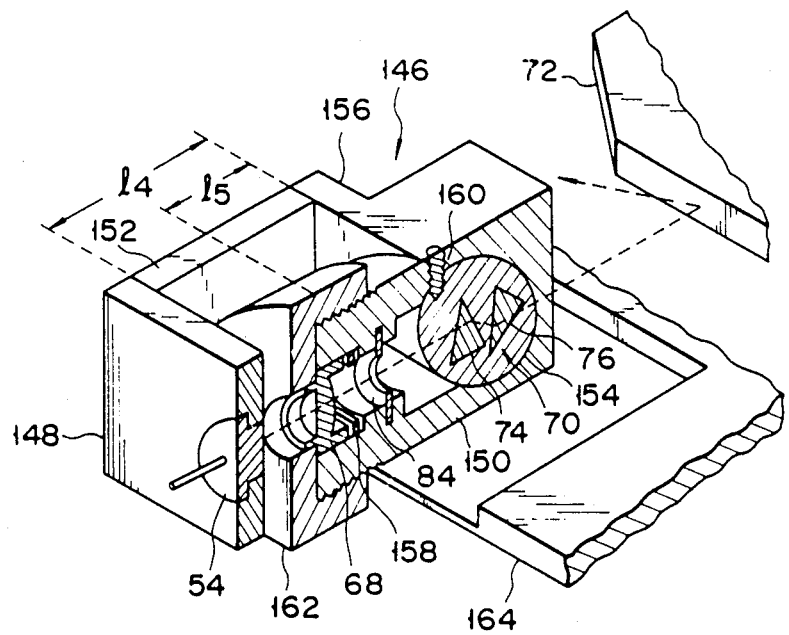
FIG. 13 is a view for explaining images on the photosensitive drum formed by the optical apparatus shown in FIG. 9.
FIG. 14 is a partially cutaway, sectional, perspective view of a collimator unit of the optical apparatus shown in FIG. 9.
Figure 15:
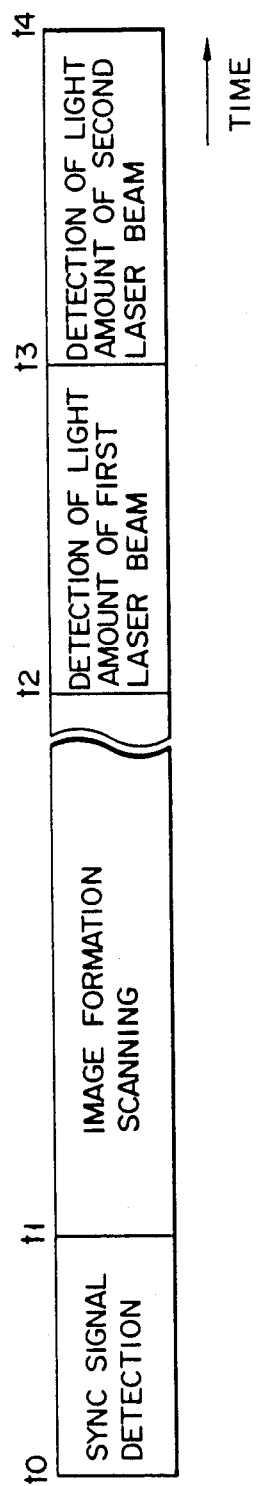
FIG. 15 is a view for explaining a time table of a laser beam during one scanning period of the optical apparatus shown in FIG. 9.

Driver 94, comprising data control circuit section 90 and stabilizer circuit section 92, for driving light emission units 62 and 64 of laser emission device 54 will be described below with reference to FIG. 12. Data control circuit section 90 stores image data transferred from data transfer section 96 of the host system such as a computer. Data buffer unit 98 comprises first, second and third line buffers 100, 102 and 104 for alternately holding image data for one line. The alternate data storage operation is achieved by sending an "end" signal after every one-line signal or counting image data for one line. In this embodiment, as shown in FIG. 13, images A and B are simultaneously formed by beam spots of first and second laser beams 58 and 60 on $3\times 0.085$-mm wide scanning lines on photosensitive drum 66 to have a gap corresponding to two scanning lines therebetween. For this purpose, data buffer unit 98 has third line buffer 104, connected to the output terminal of first line buffer 100, for reholding image data. Reference numerals 106 and 108 denote first and second laser drive units for outputting image data in third and second line buffers 104 and 102 to first and second light emission units 62 and 64, respectively.

When plural laser drive units are used, number T of line buffers corresponding to an ith one of the plurality of laser drive units is given by:

$$T=[max(m_i)-m_i+1] \qquad (18)$$

where $m_i$ is $[P_i/n_i]$, n is the total number of light emission units, $P_i$ is the number of scanning lines falling between a laser beam at a reference position (i=1) and an ith laser beam, and max($m_i$) is the maximum value of [$P_i/n$]. Therefore, the number of line buffers corresponding to first laser drive unit 106 is "1−0+1=2" from equation (18). Data buffer unit 98 thus comprises first and third line buffers 100 and 104. Meanwhile, the number of line buffers corresponding to second laser drive unit 108 is "1−1+1=1". For this reason, data buffer unit 98 comprises only second line buffer 102.

Reference numeral 110 denotes a sync circuit. Sync circuit 110 receives a sync signal from pin diode 112, and then sends a timing signal to data controller 116 in synchronism with an arbitrary count of clock circuit 114. Data controller 116 controls data buffer unit 98 based on this timing signal.

Reference numeral 118 denotes a sync detector (FIG. 9) for detecting a timing for sending image data to first and second laser drive units 106 and 108. Sync detector 118 has reflection mirror 120, first cylindrical lens 112 having focusing power in the sub-scan direction, and pin diode 112 (FIG. 12) for receiving laser beams 58 and 60.

Stabilizer circuit section 92 has light-amount detector 126 consisting of a single pin diode arranged behind light emission units 62 and 64. The detection result from light-amount detector 126 is supplied to first or second comparison amplifier 130 or 132 through switching unit 128. First comparison amplifier 130 compares the detection voltage from light-amount detector 126 and a first reference voltage from first beam light-amount setting unit 134. Second comparison amplifier 132 compares the detection voltage from light-amount detector 126 and a second reference voltage from second beam light-amount setting unit 136. The comparison results from first and second comparison amplifiers 130 and 132 are respectively input to first and second sample-hold units 138 and 140. The output voltages from sample-hold units 138 and 140 are respectively supplied to first and second current amplifiers 142 and 144. First and second current amplifiers 142 and 144 amplify currents, and output the amplified currents to first and second laser drive units 106 and 108, respectively. In this case, the first and second reference voltages are set at values so that light amounts of first and second laser beams 58 and 60 radiated on photosensitive drum 66 are equal to each other in consideration of light emission characteristics of first and second light emission units 62 and 64 at the normal temperature and a light amount cut by stop 84.

Laser emission device 54, collimator lens 68, stop 84, and prism compressors 74 and 76 are integrally supported by single collimator unit 146, as shown in FIG. 14. More specifically, unit 146 has first and second support members 148 and 150, and spacer 152. First support member 148 is formed of an aluminum material for supporting laser emission device 54 and serving as a heat dissipation plate. Second support member 150 supports collimator lens 68, stop 84, and first and second prisms 74 and 76 through prism holder 54. Second support member 150 is formed of an aluminum die-cast material having linear expansion coefficient $a_2 = 7.0 \times 10^{-6}$. Spacer 152 is interposed between first support member 148 and projecting portion 156 of second support member 150. Spacer 152 is formed of polycarbonate having linear expansion coefficient $a_1 7.0 \times 10^{-5}$, and has length $L_4$ of about 42.38 mm at the normal temperature. Distance $l_5$ from the side end portion of projecting portion 156 of second support member 150 to collimator lens 68 supported by second support member 150 is about 20 mm at normal temperature. Reference numeral 158 denotes a wave washer for urging collimator lens 68. Reference numeral 160 denotes an setscrew for adjusting an optical axis in the sub-scan direction by rotator prism holder 154 in second support member 150 so as to rotate prism compressors 74 and 76. Reference numeral 162 denotes a positioning member which is rotated to move collimator lens 68 along the optical axis. Collimator unit 146 is fixed to guide plate 164 by a screw (not shown) after it is slid along the optical axis to adjust its position.

The operation will be described below. A print instruction is generated by the host system (not shown) in response to a print start command, and laser emission device 54 is operated in response to the print instruction. Thus, sync detector 118 detects a start signal. At the same time, image data of line numbers $A_1$ and $B_0$ shown in FIG. 13 are input from data transfer section 96 to first and second line buffers 100 and 102 line by line, respectively. In FIG. 13, portions of line numbers indicated by A are image data for first light emission unit 62, and portions indicated by B are image data for second light emission unit 64. Data buffer unit 98 is controlled by data controller 116 in accordance with the sync signal generated by sync circuit 110 in response to the start signal from pin diode 112 and the count signal from clock circuit 114. More specifically, data in first line buffer 100 is transferred to third line buffer 104. Meanwhile, second laser drive unit 108 drives second light emission unit 64 in accordance with the data in second line buffer 102. Thus, an image corresponding to a portion of line number $B_0$ on photosensitive drum 66 is formed. At the same time, new data of line numbers $A_2$ and $B_1$ are respectively input to first and second line buffers 100 and 102. Thereafter, data in line buffers 100, 102, and 104 are sequentially input to laser drive units 106 and 108 in accordance with the sync signal from sync circuit 110 in the order shown in Table 1 below. Latent images corresponding to pairs of line numbers $(A_1, B_1), (A_2, B_2), \ldots, (A_n, B_n), \ldots$ are simultaneously formed on photosensitive drum 66 by first and second laser beams 58 and 60.

TABLE 1

| (Data in Line Buffers at Arbitrary Sync Signal) | | | | |
|---|---|---|---|---|
| Sync Signal No. | ... | n | ... | 2 | 1 |
| First Line Buffer | ... | $A_n$ | ... | $A_2$ | $A_1$ |
| Third Line Buffer | ... | $A_{n-1}$ | ... | $A_1$ | — |
| Second Line Buffer | ... | $B_{n-1}$ | ... | $B_2$ | $B_0$ |

In the present invention, position S of an ith one of a plurality of laser beams on an image carrier (photosensitive drum) has the relation given by:

$$S_i = [(nm_i + k_i)P_2] \tag{19}$$

where n is the total number of light emission units, $k_i$ is $[i-1]$, $m_i$ is an arbitrary integer, and $P_2$ is the image pitch in the sub-scan direction. This position is shifted by $nP_2$ upon each scanning. Therefore, position S' of an arbitrary laser beam is given by:

$$S' = S + (u-1) \times nP_2 \tag{20}$$

(where u is the scanning count by laser beams)

Therefore, in this embodiment, if the position of line number $A_1$ by first laser beam 58 on photosensitive drum 66 is represented by "0", the position of line number $B_1$ by second laser beam 60 is represented by "$3P_2$" from equation (19). The positions of laser beams 58 and 60 scanning line numbers $A_1$ and $B_2$ upon next scanning are respectively "$0+2P_2=2P_2$" and and "$3P_2+2P_2=5P_2$" from equation (20). Thereafter, these positions are determined according to equation (20).

During the operation of laser emission device 54, stabilizer circuit section 92 is operated to compensate for a variation in light amount due to variation in light emission characteristics of light emission units 62 and 64 caused by a change in temperature. More specifically, during a single scanning by scanning mirror 72, laser beams 62 and 64 are used according to a time table shown in FIG. 15. More specifically, the first and second light emission unit 62 and 64 is turned on, and the sync signal is detected during a time interval between times $t_0$ and $t_1$. Image formation scanning is performed during a time interval between times $t_1$ and $t_2$. During a time interval between times $t_2$ and $t_3$, second light emission unit 64 is turned off, and first light emission unit 62 is turned on. Thus, the light amount of only first laser beam 58 by first light emission unit 62 is input to light-amount detector 126. During a time interval between times $t_3$ and $t_4$, first light emission unit 62 is turned off, and at the same time, second light emission unit 64 is turned on. Thus, a current flows through each laser diode so that the light amount of only second laser beam 60 is proportional to the light emission amount of the laser diode. The current is converted to a voltage by a resistor. In order to compensate for a difference in proportionality constants of the light emission amount of the laser diodes and the current depending on the characteristics of the laser diodes, the above-mentioned voltage is input to light-amount detector 126 for amplifying the voltage by an operational amplifier whose amplification factor is variable with respect to the voltage signal. In accordance with the detection results from light-amount detector 126, the voltages are fed back to light emission units 62 and 64, thus adjusting the currents. For example, if a message indicating that the light amount by first laser beam 58 is decreased and the detection voltage from light-amount detector 126 is lower than the first reference voltage from first beam light-amount setting unit 134 is input to first sample-hold unit 138 from first comparison amplifier 130 consisting of a first comparator, amplifier, and integral unit, and outputting a value according to a voltage from first beam light-amount setting unit 134, first sample-hold unit 138 samples the output voltage, and causes current amplifier 142 to increase the current value to be flowed. Thus, first laser drive unit 106 increases the drive current value to first light emission unit 62. The above-mentioned operation is repeated during a time interval between $t_2$ and $t_3$. With this operation, after the output is sufficiently close to a preset output, sample-hold unit 138 is set in a hold state, and the output is maintained. In this manner, the light amount of first laser beam 58 is stabilized.

Figure 16:
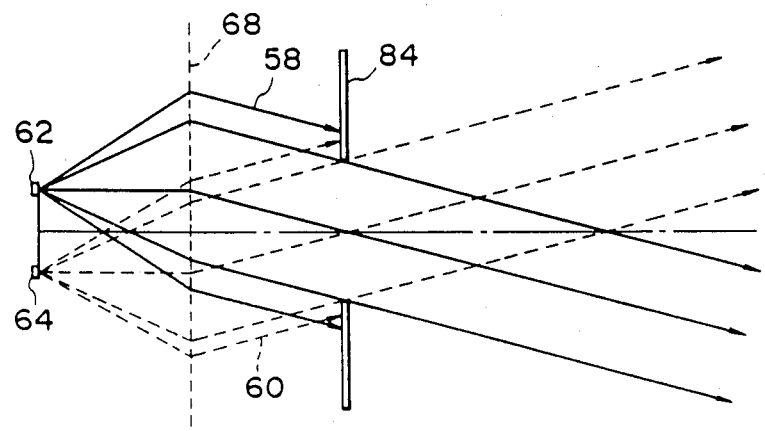
FIGS. 16 and 17 are views for explaining a laser beam path passing through a diaphragm of the optical apparatus shown in FIG. 9.
Figure 17:
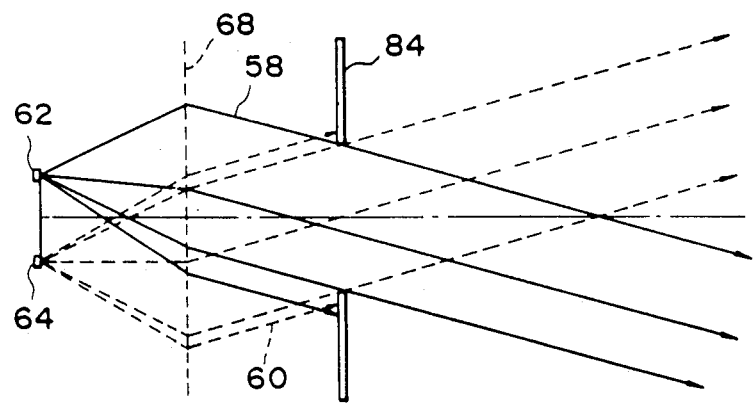

As described above, when first and second laser beams 58 and 60 are simultaneously emitted from first and second light emission units 62 and 64, laser beams 58 and 60 are converted by collimator lens 68 into collimated beams each having beam radius $\omega_F \approx 1.444$ mm. Thereafter, if laser beams 58 and 60 are nonuniform, the radii of laser beams 58 and 60 are uniformed by stop 84, as shown in FIG. 16, or output directions of laser beams 58 and 60 are rendered symmetrical about the optical axis, as shown in FIG. 17.

Thereafter, laser beams 58 and 60 are compressed to have beam radius $\omega_{MF} \approx 0.289$ mm by prism compressor 70. Laser beams 58 and 60 are guided to scanning mirror 72. Surface oscillation caused by rotation of scanning mirror 72 is corrected by both first and second f-θ lenses 80 and 82 of f-θ lens system 86. Laser beams 58 and 60 simultaneously scan the positions separated by two scanning lines on photosensitive drum 66 in the main scan direction. Thus, electrostatic latent images are formed.

In f-θ lens system 86, two f-θ lenses 80 and 82 are combined to obtain its f-θ effect. For this reason, a distance from f-θ lens system 86 to the surface of photosensitive drum 66 is deviated due to a variation in manufacturing precision. Since f-θ lenses 80 and 82 are plastic lenses, a composite focal length is varied due to a change in ambient temperature, and a distance from f-θ lens system 86 to the surface of photosensitive drum 66 is apparently varied. Deviation ΔX of heights of laser beams 58 and 60 in the sub-scan direction on photosensitive drum 66 caused by the above-mentioned variation will be described in detail below with reference to FIGS. 11A and 11B. On photosensitive drum 66, since a gap corresponding to two scanning lines is formed between first and second laser beams 58 and 60, and $\beta = 1$, $$h_{MF} = h_{dF}/\beta = 0.085 \text{ mm}$$

Furthermore, if $\theta_M = 30°$ and $\tan \Delta\theta = l_B/2F_C \cdot \alpha$, since $a = 30$ mm, $b = 200$ mm, $c = 30$ mm, $f_1 = 30$ mm, $f_2 = 30$ mm, $l_B = 0.1$ mm, and $F_C = 9.629$ mm, $$\tan \Delta\theta = \frac{0.1 \times 5}{2 \times 9.629} \approx 0.026$$

From equation (13), $$l_9 = -\left(\frac{1}{30} - \frac{0.026}{0.1275 \times 0.866 + 30 \times 0.026}\right)^{-1} + 200$$

$$\approx -43.9 \text{ (mm)}$$

From equation (14), $$l_{10} = \left(\frac{1}{30} - \frac{1}{(-43.9)}\right)^{-1} \approx 17.825 \text{ (mm)}$$

Therefore, from equation (12), deviation ΔX of heights of laser beams 58 and 60 on photosensitive drum 66 is given by:

$$\Delta X = (0.1275 + 30 \times 0.026 \times 1.155) \times \frac{43.9}{200 + 43.9} \times \frac{l_{AB}}{17.825} = 0.0104 l_{AB}$$

The operation of collimator unit 146 will be described below. Adjustment of collimator unit 146 is performed such that positioning member 162 is pivoted, and collimator lens 68 is then moved along the optical axis. Thus, beam radius $\omega_{MF}$ of each of laser beams 58 and 60 on scanning mirror 72 is adjusted to be $\omega_{MF} = P_2/2\beta = 0.0425$ mm. Prism holder 154 is rotated by setscrew 160, so that the center of each laser beam coincides with the optical axis in the sub-scan direction of the focusing lens system. Thereafter, collimator unit 146 is moved in a direction parallel to the optical axis of collimator lens 68. Thus, based on equations (6) and (9), distance $l_3$ from the light exit surface of prism compressor 70 to scanning mirror 70 is varied, so that distance $h_{MF}$ of each of laser beams 58 and 60 from the optical axis on scanning mirror 72, and distance $h_{dF}$ of each of laser beams 58 and 60 from the optical axis on photosensitive drum 66, i.e., an interval between laser beams 58 and 60, can be adjusted. Therefore, after the beam radius is adjusted, collimator unit 146 is slid along guide plate 164 along the optical axis of collimator lens 68 so as to yield $h_{MF}=0.085\times3/2=0.1275$ (mm), and is fixed on guide plate 164 by a screw (not shown). In this manner, adjustment of collimator unit 146 is completed.

Since collimator lens 68 is a plastic lens, if an ambient temperature is changed, its focal length is varied as follows:

$$\Delta F_C = \left(-\frac{1}{n-1}\frac{\partial n}{\partial t} + \frac{1}{l}\frac{\partial l}{\partial t}\right)F_C\Delta t$$

$$= \left(-\frac{1}{1.492-1}(-1.1\times10^{-4}) + 7\times10^{-5}\right)\times 9.629\Delta t$$

$$\doteq 2.827\times10^{-3}\Delta t \text{ (mm)}$$

Meanwhile, first support member 148 and spacer 152 of collimator unit 146 are also deviated, and a deviation of a distance between laser emission device 54 and collimator lens 68 is given by:

$$\Delta l = (l_4\times\alpha_1 - l_5\times\alpha_2)\Delta t$$

$$= (42.38\times7.0\times10^{-5} - 20\times7.0\times10^{-6})\Delta t$$

$$\doteq 2.827\times10^{-3}\Delta t \text{ (mm)}$$

More specifically, deviation $\Delta F$ of the focal length of collimator lens 68 is almost equal to deviation $\Delta l$ of the length between laser emission device 54 and collimator lens 68. Thus, deviation $\Delta F$ of the focal length of collimator lens 68 is compensated for.

With this arrangement, since first and second laser beams 58 and 60 are simultaneously scanned to be separated by a gap corresponding to two scanning lines, laser emission device 54 need not be inclined with respect to the scanning direction. In addition, since the array of light emission units 62 and 64 is parallel to the sub-scan direction, image positions are not offset on photosensitive drum 66 in its longitudinal direction. For this reason, a shift register and the like for compensating for an image offset need not be arranged unlike in the conventional apparatus. Thus, high-speed, high-equality printing can be achieved. Furthermore, degradation of image quality caused by inclination of the sectional shapes of laser beams can be prevented.

Since driver 94 for light emission units 62 and 64 has stabilizer circuit 92, a variation in light amount of laser beams 58 and 60 due to a change in temperature or the like can be prevented. Thus, a stable image density can be obtained.

The focal length of first f-$\theta$ lens 80 is set so that power for focusing light in the sub-scan direction is larger than power for focusing light in the main scan direction in first f-$\theta$ lens 80 of f-$\theta$ lens system 86. For this reason, in first f-$\theta$ lens 80, laser beams 58 and 60 are focused in the sub-scan direction. Therefore, the distance of laser beams 58 and 60 on second f-$\theta$ lens 82 is reduced as compared to conventional ones, and the incident angles of laser beams 58 and 60 from second f-$\theta$ lens 82 to photosensitive drum 66 are reduced. Thus, deviations of laser beams 58 and 60 in the sub-scan direction on photosensitive drum 66 can be greatly reduced regardless of a deviation of the distance between second f-$\theta$ lens 82 to photosensitive drum 66, thus improving image quality.

In radiation device 56, since the radii and exit angles of first and second laser beams 58 and 60 can be uniformed by diaphragm 84, image quality by laser beams 58 and 60 can be averaged, and image quality can be improved.

Since laser emission device 54, collimator lens 68, stop 84, and prism compressor 70 are installed in single collimator unit 146, a distance between laser beams 58 and 60 can be easily and reliably adjusted upon movement of collimator unit 146 along guide plate 164, thus improving operability upon adjustment. In collimator unit 146, since collimator lens 68 can be moved along the optical axis by positioning member 162, the radii of laser beams 58 and 60 can be easily adjusted. In addition, since the length of spacer 152 changes in accordance with a deviation of the focal length of collimator lens 68 due to a change in temperature, the position of the first support member 148 is varied, and a distance between laser emission device 54 and collimator lens 68 can be varied. Thus, the deviation of the focal length of collimator lens 68 can be compensated for without inclining collimator lens 68 unlike in the conventional apparatus. As a result, a decrease in focusing rate can be prevented, and image quality can be improved.

Figure 18:
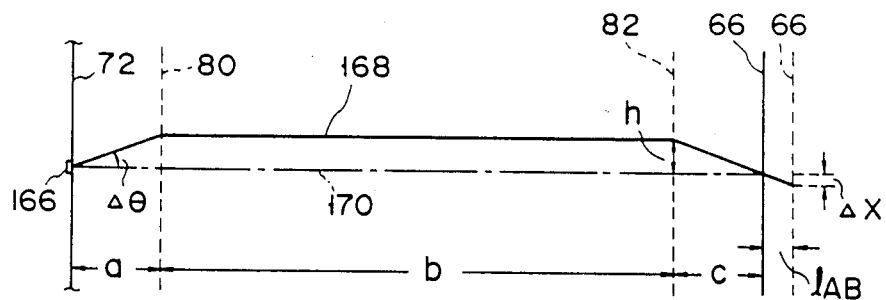
FIG. 18 is a view for explaining a laser beam path in the sub-scan direction between a scanning mirror and a photosensitive drum according to a second embodiment of the present invention.

A second embodiment of the present invention will be described hereinafter with reference to FIG. 18. In the second embodiment, a single light emission unit is arranged, and other arrangements are the same as those in the first embodiment. Therefore, the same reference numerals in this embodiment denote the same parts as in the first embodiment, and a detailed description thereof will be omitted. A laser emission device (not shown) has single light emission unit 166 driven by a driver (not shown). Printing is started, and laser beam 168 emitted from light emission unit 166 becomes incident on scanning mirror 72 along the optical axis of radiation device 56. Thereafter, laser beam 168 becomes incident on first f-$\theta$ lens 80 at angle $\Delta\theta$ with respect to the optical axis due to surface oscillation of scanning mirror 72. Since scanning mirror 72 is located at the focal point of first f-$\theta$ lens 80, laser beam 168 is output from first f-$\theta$ lens 80 to be parallel to the optical axis, and is then incident on second f-$\theta$ lens 82. Laser beam 168 is focused along the optical axis, and is radiated on photosensitive drum 66. Deviation $\Delta X$ of the height of laser beam 168 due to a displacement of the surface of photosensitive drum 66 along the optical axis will be described in detail below. If a displacement of the surface of photosensitive drum 66 is represented by $l_{AB}$, $h/c = \Delta X\ l_{AB}$ from FIG. 18 (where h is the distance of laser beam 168 from optical axis 170 on f-$\theta$ lenses 80 and 82). Since distances h of laser beam 168 from optical axis 170 on first and second f-$\theta$ lenses 80 and 82 are equal to each other, $$X = \frac{h}{c}l_{AB} = \frac{l}{C}\times\frac{\tan\Delta\theta\times a}{\cos\theta_M}\times l_{AB} \quad (21)$$

Since $h_{MF}=0$, $\theta_M=30°$, $\tan\Delta\theta=3\times10^{-4}$, $a=30$ mm, $b=200$ mm, and $c=30$ mm, from equation (21), $$\Delta X = \frac{1}{30}\times\frac{3\times10^{-4}\times30}{\cos30°}l_{AB} = 3.36\times10^{-4}l_{AB}$$

With this arrangement, since the focal length is set so that power for focusing light in the sub-scan direction of first f-$\theta$ lens 80 is larger than that in the main scan direction, the height of laser beam 168 on second f-$\theta$ lens 82 is reduced as compared to a conventional one, and the incident angle of laser beam 168 onto photosensitive drum 66 can be reduced. Therefore, a variation in laser beam 168 in the sub-scan direction on photosensitive drum 66 can be eliminated regardless of a displacement of the surface of photosensitive drum 66, and as a result, image quality can be improved.

Figure 19:
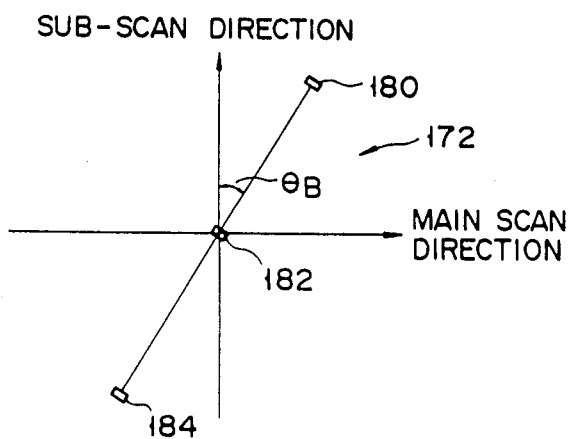
FIG. 19 is a view showing an installation direction of a light emission unit of a laser emission device according to a third embodiment of the present invention.
Figure 20:
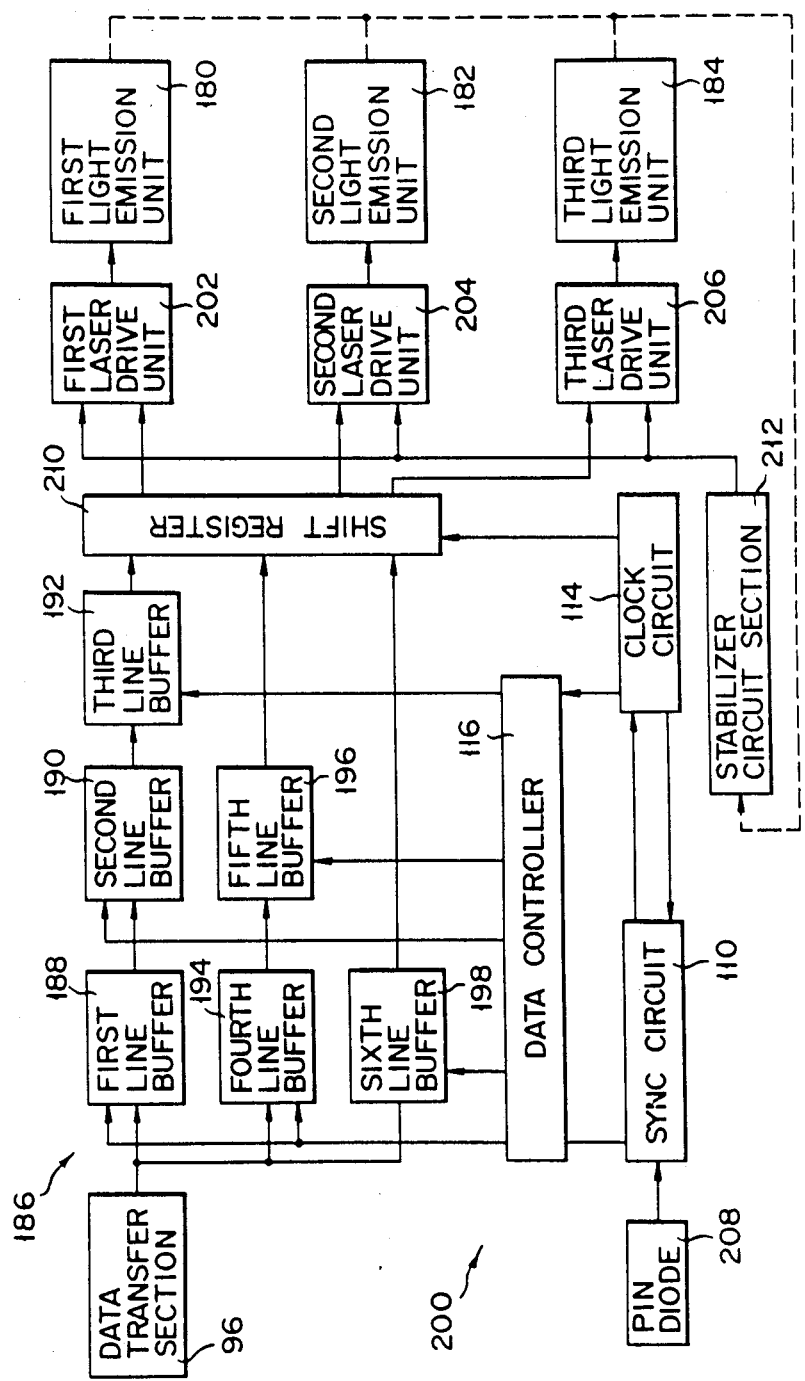
FIG. 20 is a block diagram showing a driver of the laser emission device shown in FIG. 19.
Figure 21A:
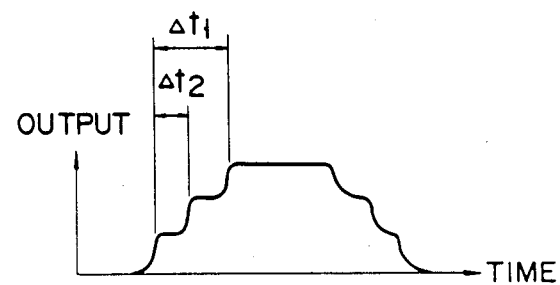
FIG. 21A is a graph showing output characteristics of a pin diode of the driver shown in FIG. 20 before a shift register is adjusted.
Figure 21B:
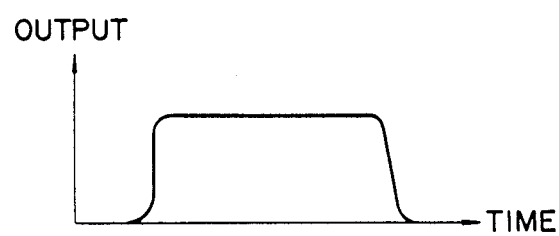
FIG. 21B is a graph showing output characteristics of the pin diode of the driver shown in FIG. 20 after the shift register is adjusted.
Figure 22:
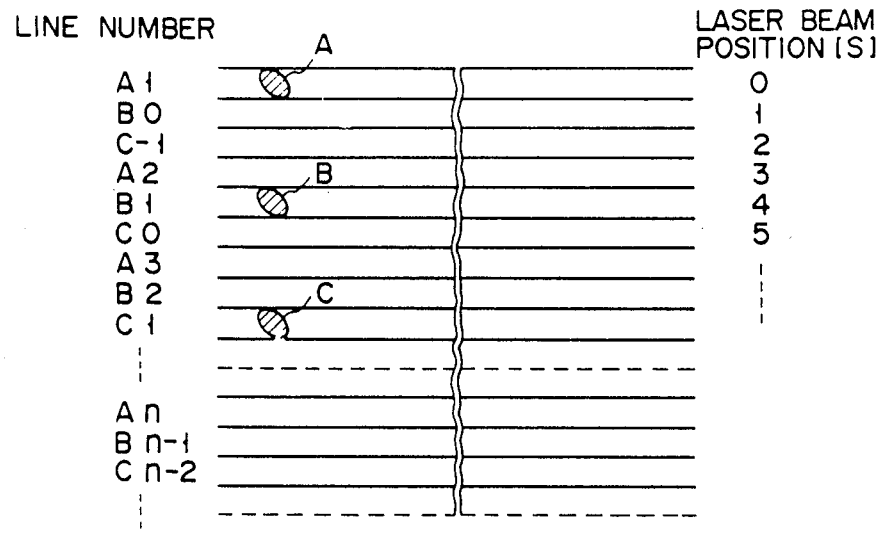
FIGS. 22 and 23 are views showing images on a photosensitive drum of the third embodiment.
Figure 23:
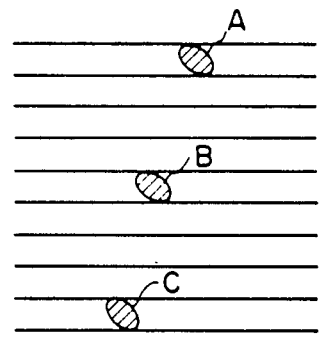
Figure 24A:
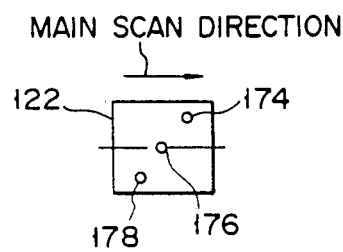
FIGS. 24A to 24C are views for explaining the horizontal cycle detection of a laser beam passing through a cylindrical lens of the third embodiment.
Figure 24B:
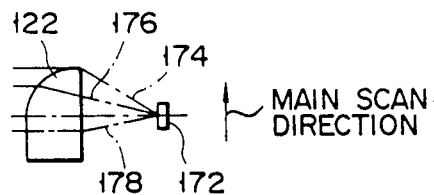
Figure 24C:
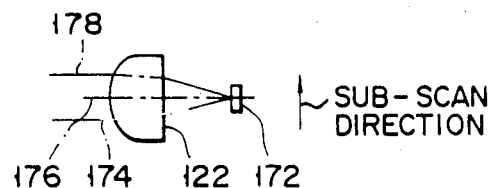

A third embodiment of the present invention will be described hereinafter with reference to FIGS. 19 to 24C. In the third embodiment, three light emission units are arranged, and a laser emission device is inclined at 30° with respect to the sub-scan direction so that a gap corresponding to three scanning lines is formed between adjacent laser beams emitted from the light emission units. Other arrangements are the same as those in the first embodiment. Thus, the same reference numerals in this embodiment denote the same parts as in the first embodiment, and a detailed description thereof will be omitted. As shown in FIG. 19, first to third light emission units 180, 182, and 184 for emitting first to third laser beams 174, 176, and 178 are juxtaposed at intervals $l_B = 154$ μm in laser emission device 172. Angle $\theta_B$ defined by the alignment direction of first to third light emission units 180, 182, and 184 of laser emission device 172 and the sub-scan direction is set to be 30°. In driver 186 as shown in FIG. 20, three, i.e., first to third line buffers 188, 190, and 192 are arranged for first light emission unit 180, two, i.e., fourth and fifth line buffers 194 and 196 are arranged for second light emission unit 182, and sixth line buffer 198 is arranged for third light emission unit 184. A feedback circuit (not shown), similar to that in the first embodiment, for adjusting currents of laser drive units 202, 204, and 206 in accordance with light amounts of laser beams 180, 182, and 184 is arranged in stabilizer circuit section 212. Data control circuit section 200 has sync detector 110 as a horizontal sync detection means having pin diode 208 on which all laser beams 174, 176, and 178 are incident, and shift register 210 for correcting offsets of laser beams 174, 176, and 178 on photosensitive drum 66 in its longitudinal direction. During adjustment, sync device 172 is driven, and all the laser beams 174, 176, and 178 are input to pin diode 172 through reflection mirror 120 and cylindrical lens 122 for a predetermined period of time. When the output characteristics are displayed on a display unit (not shown), the characteristics illustrated in FIG. 21A are obtained. A delay time of a laser beam having the first scanning position in the scanning direction by shift register 210 is represented by $t_1$. If second and third delay times are represented by $t_2$ and $t_3$, respectively, third light emission unit 184 for laser beam 178 which is input lastly is turned on before laser beam 178 is input to sync detector 110, and first and second light emission units 180 and 182 are turned on after a time period corresponding to a time set by shift register 210 has elapsed ($t_3$ is fixed). In this case, optical paths of laser beams 174, 176, and 178 on first cylindrical lens 122 are as shown in FIGS. 24B and 24C. Therefore, the shift amount of shift register 210 is adjusted while monitoring the output until the output characteristics become those illustrated in FIG. 21B, thus synchronizing laser beams 174, 176, and 178. In this manner, after adjustment, a printing operation is started in response to a print signal, and laser beams 174, 176, and 178 are emitted while sequentially shifting light emission units 180, 182, and 184. Thus, first and third laser beams 174 and 178 propagate through optical paths symmetrical with the optical axis of collimator lens 68, while second laser beam 176 propagates along the optical axis of collimator lens 68. First to third laser beams 174, 176, and 178 are simultaneously radiated on photosensitive drum 66 to have gaps each corresponding to three scanning lines. As shown in FIG. 22, latent images A, B, and C are formed. Note that in FIG. 20, reference numeral 212 denotes a stabilizer circuit.

With this arrangement, the shift amount of shift register 210 can be adjusted by only operating radiation device 56 and simultaneously monitoring the output signal from detector 110 without actually performing a printing operation unlike in the conventional apparatus. Thus, the adjusting operation can be simplified, the adjusting time can be shortened, and a reduction in manufacturing cost can be achieved. In other case, laser light emission units 180, 182, and 184 may be turned on before laser beams are input to sync detector 110 (no delay is made by shift register 210), so that $\Delta t_1$ and $\Delta t_2$ are read, and the read values are respectively input to a shift register (not shown) for first light emission unit 180 and a shift register (not shown) for second light emission unit 182. In this case, latent images on photosensitive drum 66 are a shown in FIG. 23. If $l_B = 133.3$ μm and $\theta_B = 0$ are target values, laser light emission units 180, 182, and 184 are rotated until the state illustrated in FIG. 21B is established, and $\theta_B$ can be adjusted to be 0. When $\theta_B = 0$, a signal illustrated in FIG. 21B is obtained. In this case, latent images on photosensitive drum 66 are as shown in FIG. 22.

A fourth embodiment of the present invention will be described hereinafter with reference to FIGS. 25 and 26. In this embodiment, cylindrical lens 214 having power in the sub-scan direction and serving as a means for collimating laser beams 58 and 60 so that their main beam components are parallel to the optical axis or focusing the beams is arranged in front of scanning mirror 72. The same reference numerals in this embodiment denote the same parts as in the first embodiment, and a detailed description thereof will be omitted. More specifically, cylindrical lens 214 is arranged between prism compressor 70 and scanning mirror 72, and has focal length $f_{30} \simeq 33.378$ mm in the sub-scan direction. As shown in FIG. 26, lens 214 is disposed to achieve $F_C = 9.629$ mm, $l_2$ 10 mm, $l_3 = 31.378$ mm, and $l_6 = 98.091$ mm.

The above distances are derived from the following approximate expressions. Other parameters are the same as those in the apparatus of the first embodiment. That is, $\beta \simeq 0.14712$, a gap between laser beams 58 and 60 on photosensitive drum 66 corresponds to two scanning lines, and the sub-scan directional beam diameter of each of laser beams 58 and 60 in an image plane is 85 μm. The radius of each of laser beams 58 and 60 on the surface of scanning mirror 72 and distance from the optical axis to laser beams 68 and 60 are:

From equations (10) and (9)

$$\omega_{MF} = 577/2 = 288.5 \text{ μm}$$

$$h_{MF} = 3 \times 85/2/\beta = 866.6 \text{ μm}$$

For $$h_{MF} = \frac{l_B}{2F_C} \times l_2 + \frac{l_B}{2F_C \times a} \times l_3 \quad (22)$$

$$f_{30} = l_3 + l_2 \times a \quad (23)$$

(This is a condition that the centers of laser beams 58 and 60 are parallel to optical axis 216 of scanning mirror 72 after they pass through second cylindrical lens 82)

$$\frac{l_6 - l_3 - f_{30}}{f_{30}} = \frac{\theta_{MF}}{\alpha \cdot \tan\theta_{\omega F} \times F_C} \quad (24)$$

If $F_C = 9.629$ mm, $l_2 = 10$ mm, $\tan\theta_{\omega F} = 0.15$,
$l_B = 0.1$ mm, and $\alpha = 1/5$,
From equation (22),
$166.889828 = l_2 + 5l_3 \quad (22')$
From equation (23),
$5f_{30} = l_2 + 5l_3 \quad (23')$
From equation (24),
$l_6 - l_3 = 66.71317893 \quad (24')$
From equations (22'), (23'), and (24'),
$l_3 \doteq 31.3779659$ mm
$f_{30} \doteq 33.3779659$ mm
$l_6 \doteq 98.09114$ mm When the printing operation is started, and laser beams 58 and 60 are emitted from laser emission device 54 upon driving of the driver (not shown), laser beams 58 and 60 reach second cylindrical lens 82 through collimator lens 68 and prism compressor 70. Laser beams 58 and 60 are deflected by second cylindrical lens 82 to be parallel to optical axis 216 of scanning mirror 72, i.e., to establish $\alpha \times \theta_{2F} = 0$. Thereafter, laser beams 58 and 60 are incident on scanning mirror 72. Deviation $\Delta h_{dF}$ of positions of laser beams 58 and 60 in the sub-scan direction on photosensitive drum 66 due to a deviation of distance $l_6$ from the light exit surface of prism compressor 70 to scanning mirror 72 is expressed by equation (17). According to this embodiment, since $\tan(\alpha \times \theta_{2F}) = 0$, $\Delta h_{dF} = 0$. Therefore, a variation in laser beams 58 and 60 in the sub-scan direction on photosensitive drum 66 caused by a difference between innermost and outermost diameters of scanning mirror 72 can be eliminated.

With this arrangement, since an angle defined by optical axis 216 of scanning mirror 72 and laser beams 58 and 60 in a projected in the sub-scan direction can be 0, a deviation of distance of laser beams 58 and 60 from the optical axes on photosensitive drum 66 is not generated regardless of a deviation of a distance from the light exit surface of prism compressor 70 to scanning mirror 72. Therefore, a straight line can be drawn on photosensitive drum 66. Thus, an image distortion can be prevented, and image quality can be improved.

Figures 27, 28:
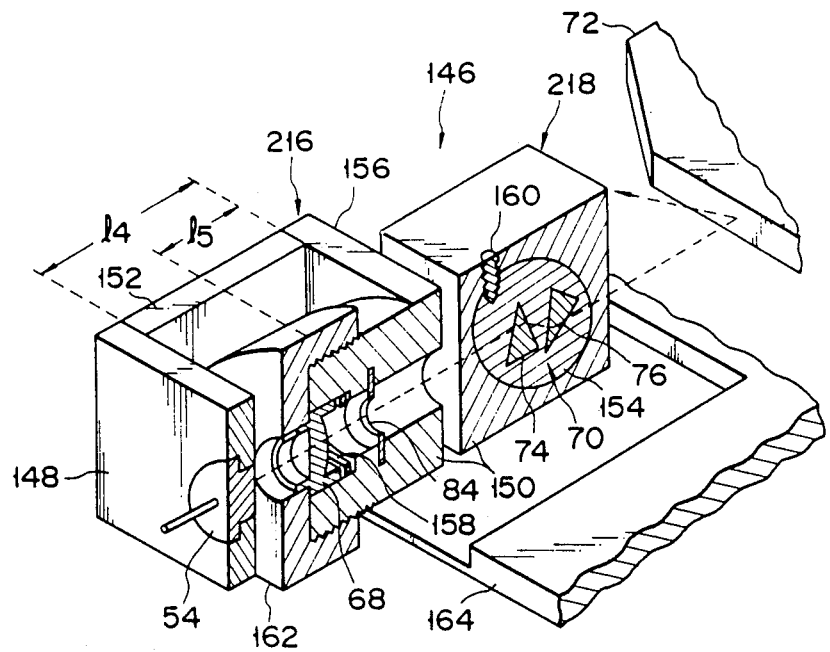
FIG. 27 is a partially cutaway, sectional, perspective view of a unit for supporting a prism compressor of a laser emission device according to a fifth embodiment of the present invention.
FIG. 28 is a view for explaining images on a photosensitive drum according to a modification of the light emission unit of the laser emission device.

A fifth embodiment of the present invention will be described hereinafter with reference to FIG. 27. In the fifth embodiment, prism compressor 70 as a beam compression device is supported by a support member separate from a unit for integrally supporting laser emission device 54 and collimator lens 68. Other arrangements are the same as those in the first embodiment. Thus, the same reference numerals in this embodiment denote the same parts as in the first embodiment, and a detailed description thereof will be omitted. In this embodiment, collimator unit 146 in the first embodiment is divided into first unit 216 for integrally supporting laser emission device 54 and collimator lens 68 and second unit 218 for supporting first and second prisms 74 and 76 through prism holder 154. First and second units 216 and 218 are separately movable or one of them is movable along the optical axis of collimator lens 68, and are attached to guide plate 164. As in the first embodiment, positioning member 162 is pivoted during adjustment, and a distance between collimator lens 68 and semiconductor laser 54 is adjusted. Thereafter, first unit 216 is moved on guide plate 164 along the optical axis. Thus, first unit 216 is adjusted so that beam radius $\omega_{MF}$ of each of laser beam 58 and 60 on scanning mirror 72 is $\omega_{MF} = 0.0425$ mm. Thereafter, first unit 216 is fixed on guide plate 164 by a screw (not shown). According to equations (6) and (9), distance $l_2$ from collimator lens 68 to the light exit surface of prism compressor 70 and distance $l_3$ from the light exit surface of prism compressor 70 to scanning mirror 72 are varied, so that distance $h_{Fd}$ of laser beams 58 and 60 from the optical axes on photosensitive drum 66, i.e., an interval between laser beams 58 and 60 can be adjusted. Therefore, after the beam radius is adjusted, second unit 218 is slid on guide plate 164 along the optical axis so as to yield $h_{MF} = 0.085 \times 3/2 = 0.1275$ mm. Second unit 218 is then fixed to guide plate 164 by a screw (not shown). Adjustment of an interval between laser beams 58 and 60 is thus completed. Fine adjustment of radiation angles of laser beams 58 and 60 can be performed such that setscrew 160 of second unit 218 is untightened and prism holder 154 is pivoted.

With this arrangement, an interval between laser beams 58 and 60 can be adjusted by only sliding second unit 218. The radiation angles of laser beams 58 and 60 can be easily adjusted by pivoting only prism holder 154. Therefore, operability upon adjustment can be improved, and an interval between laser beams 58 and 60 can be easily changed.

The present invention is not limited to the above embodiments, and various design modifications may be made. For example, the number of light emission units of the laser emission device is not limited to those described in the embodiments. In the first embodiment, a pitch between laser beams 58 and 60 on the image carrier can be arbitrarily determined. For example, if position $S_i$ of an arbitrary ith laser beam in the first direction is given by $S_i = (nm_i + k_i)P_2$, intervals between adjacent ones of images A, B, and C formed on the image carrier by beams spots of the laser beams from three light emission units need not be equal to each other, as shown in the first modification of FIG. 28 (where n is the total number of light emission units, $m_i$ is an arbitrary integer, and $P_2$ is the image pitch in the first direction).

In the first modification, from equation (18), the number of line buffers of the laser drive unit for a light emission unit for forming image A is 4, the number of line buffers for a light emission unit for forming image B is 2, and the number of line buffers for a light emission unit for forming image C is 1. Images A, B, and C are offset by $3P_2$, and are simultaneously scanned in units of $A_1$, $B_1$, $C_1$, ..., $A_n$, $B_n$, $C_n$. In this manner, all the pitches on the photosensitive drum are scanned. The focal lengths of the collimator lens and lenses of the f-$\theta$ lens system are not limited. The cylindrical lens for focusing a beam need not be a lens having angle $\theta_{MF} = 0$ defined by the center of the laser beam and the optical axis, but need only be a one for focusing a laser beam. In this case, in order to prevent degradation of image quality due to image distortion, a cylindrical lens having $\theta_{MF}$ given by the following equation is preferably used:

$$\frac{(R_1 - R_2) \times \tan\theta_{MF} \times \beta}{\cos\theta_{REF}} \leq 0.005 \text{ mm}$$

When the optical system of the first embodiment is used, $l_3$, $f_{30}$, and $l_6$ are considered with regard to the fact that beam centers on the image surface are parallel to each other. With reference to FIG. 11B, from equations (22) and (24), $$\frac{1}{f_{30}} = \frac{1}{l_3 + a/2} + \frac{1}{l_6 - l_3 + d - F_1} \quad (23b)$$

From equation (23b),
$f_{30} = 35.33969746$ mm
$l_6 = 102.0120956$ mm
$l_3 = 31.3779656$ mm In this case, if $l_{AB}$ is deviated, the positions of images are left unchanged.

A deviation according to equation (17) is $\Delta h_{dF} = 0.012459$ mm if $R_2 = 27$, the scanning mirror is an octahedron, $R_1 = 29.22458941$, and $\theta_{REF} = 47°$.

Figure 29:
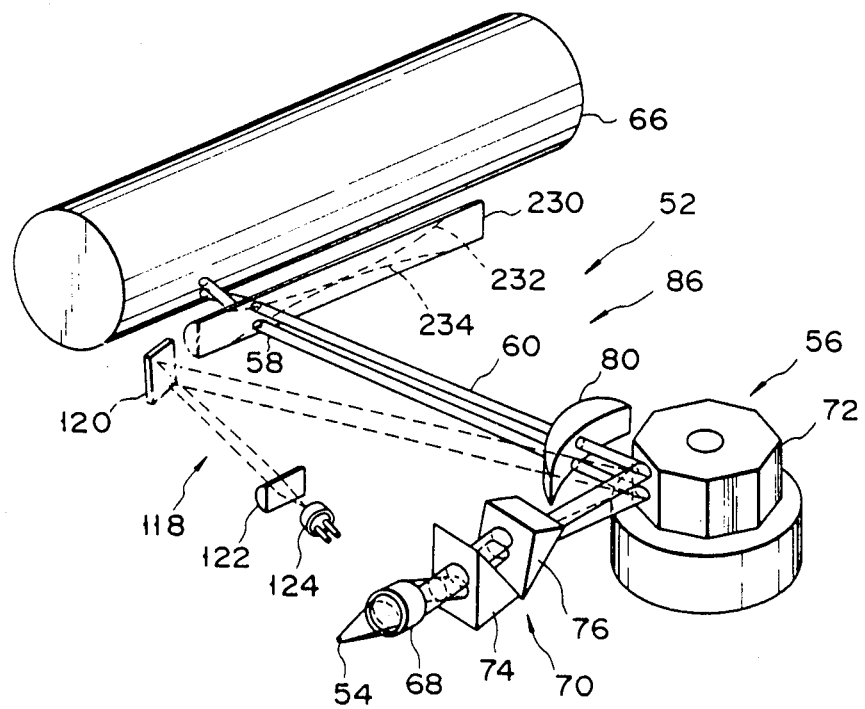
FIG. 29 is a perspective view showing a modification of a second f-$\theta$ lens of the laser emission device.

In this case, in order to prevent a deviation in laser beams on the image carrier in the sub-scan direction due to movement of reflection points of the laser beams on the scanning mirror, second f-θ lens 230 of an f-θ lens system is formed to have an asymmetrical shape as in the second modification of FIG. 29 without employing a cylindrical lens in the fourth embodiment, and its lateral magnification β is changed along passing points 232 and 234 of the laser beams. Thus, if $l_{AB}$ is deviated, the image heights are left unchanged, and a curve can be prevented from being bent.

A single light-amount detector in an output stabilizer means need not be shared by a plurality of light emission units along with a time table. For example, a special light-amount detector may be provided to each light emission unit. In order to accurately measure a light amount, the light-amount detector may be arranged along an optical path immediately after a stop device.

Figure 30A:
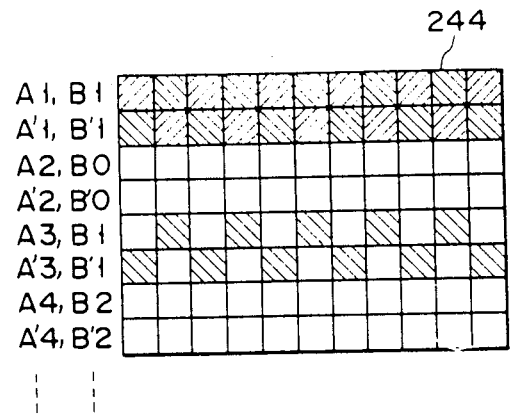
FIGS. 30A to 30C are views showing modifications of the light emission device.
Figure 30B:
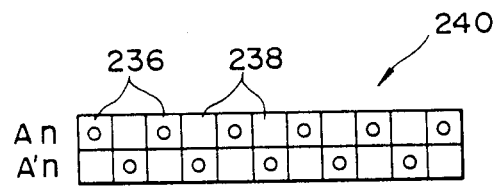
Figure 30C:
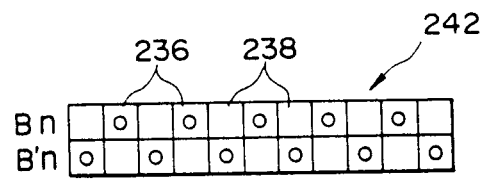

An image forming means is not limited to a laser beam from, e.g., a semiconductor laser. For example, first and second two-dimensional light emitting elements 240 and 242 comprising light emitted diodes, e.g., light transmission elements 236 and light shielding elements 238 such as liquid crystal shutters or magneto-optical shutters are aligned in a staggered manner as in the third modification shown in FIGS. 30A to 30C are used, so that the surface of image carrier 244 is simultaneously scanned. In this case, since the surface is scanned by first and second light emitting elements 240 and 242, scanning corresponding to one pitch is achieved.

What is claimed is:

1. An optical apparatus for an image forming apparatus for forming an image on an image carrier, comprising:
   means for emitting a light beam;
   means for scanning the light beam emitted by said emitting means in a first direction on said image carrier; and
   correction means for correcting distortion of the light beam scanned by said scanning means, said correction means having a correction lens in which power for focusing the light beam in a second direction perpendicular to the first direction is larger than power for focusing the light beam in the first direction.

2. An apparatus according to claim 1, wherein said light beam emitting means has a plurality of light emission units for emitting light beams, said light emission units simultaneously emitting light beams.

3. An apparatus according to claim 2, wherein said plurality of light emission units are aligned to be parallel to the second direction.

4. An apparatus according to claim 1, wherein said light beam emitting means has a plurality of light emission units for emitting light beams, and means for independently controlling light emission outputs from said light emission units.

5. An optical apparatus for an image forming apparatus for forming an image on an image carrier, comprising:
   means for emitting a light beam;
   means for converting a diffusion angle of the light beam emitted by said light beam emitting means;
   means for extracting part of the light beam whose diffusion angle is converted by said conversion means;
   means for scanning the light beam extracted by said light extraction means in a first direction on said image carrier; and
   correction means for correcting distortion of the light beam scanned by said scanning means, said correction means having a correction lens in which power for focusing the light beam in a second direction perpendicular to the first direction is larger than power for focusing the light beam in the first direction.

6. An apparatus according to claim 5, wherein said light extraction means has means for regulating a radius of the light beam.

7. An apparatus according to claim 6, wherein said regulating means has a stop for reducing a light amount of the light beam.

8. An apparatus according to claim 5, wherein said light extraction means is arranged at an image-side focal point of said conversion means.

9. An apparatus according to claim 5, wherein said conversion means has collimate means for collimating the light beam.

10. An optical apparatus for an image forming apparatus for forming an image on an image carrier, comprising:
    means for emitting a light beam;
    means for converting a diffusion angle of the light beam emitted by said light beam emitting means;
    means for directing the light beam to the image carrier whose diffusion angle is converted by said conversion means;
    means for scanning the light beam directed by said directing means in a first direction on said image carrier; and
    correction means for correcting distortion of the light beam scanned by said scanning means, said correction means having a correction lens in which power for focusing the light beam in a second direction perpendicular to the first direction is larger than power for focusing the light beam in the first direction.

11. An apparatus according to claim 10, wherein said light beam emitting means has a plurality of light emission units for emitting light beams, said light emission units simultaneously emitting light beams.

12. An apparatus according to claim 11, wherein said plurality of light emission units are aligned to be parallel to the second direction.

13. An apparatus according to claim 10, wherein said directing means has a cylindrical lens having power for focusing the light beam in only the second direction.

14. An apparatus according to claim 10, wherein said conversion means has collimate means for collimating the light beam.

* * * * *